(12) United States Patent
De' Longhi

(10) Patent No.: US 11,045,034 B2
(45) Date of Patent: Jun. 29, 2021

(54) APPARATUS WITH A MIXING DEVICE FOR COOKING FOOD

(71) Applicant: DE' LONGHI APPLIANCES S.R.L. CON UNICO SOCIO, Treviso (IT)

(72) Inventor: Giuseppe De' Longhi, Treviso (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 445 days.

(21) Appl. No.: 15/735,951

(22) PCT Filed: Jun. 10, 2016

(86) PCT No.: PCT/IB2016/053434
§ 371 (c)(1),
(2) Date: Dec. 12, 2017

(87) PCT Pub. No.: WO2016/199086
PCT Pub. Date: Dec. 15, 2016

(65) Prior Publication Data
US 2018/0160840 A1    Jun. 14, 2018

(30) Foreign Application Priority Data
Jun. 12, 2015   (IT) .......................... 102015000023346

(51) Int. Cl.
*A47J 27/00*       (2006.01)
*A47J 43/07*       (2006.01)
(Continued)

(52) U.S. Cl.
CPC ........... *A47J 27/002* (2013.01); *A47J 36/165* (2013.01); *A47J 43/0722* (2013.01);
(Continued)

(58) Field of Classification Search
CPC ........ A47J 27/002; A47J 36/06; A47J 36/165; A47J 43/0722; A47J 43/0727; A47J 43/0772; B01F 7/00208; B01F 7/00275
(Continued)

(56) References Cited

U.S. PATENT DOCUMENTS 683,474 A * 10/1901 Mackinzie .......... B01F 7/00208
                                              366/309
1,049,600 A *  1/1913 Rambeaud ................ B01F 7/16
                                              366/98
(Continued)

FOREIGN PATENT DOCUMENTS

EP           2 052 654 A1      4/2009

OTHER PUBLICATIONS

International Search Report and Written Opinion for PCT/IB2016/0503434, dated Aug. 18, 2016.
(Continued)

*Primary Examiner* — Tony G Soohoo
(74) *Attorney, Agent, or Firm* — Marshall, Gerstein & Borun LLP

(57) ABSTRACT

Apparatus for cooking foods includes an external container with protective lid of the openable type, and an extractable internal container. The internal container is open at the top and has a base wall and at least one lateral wall, a heating device connected to a possible mean to transfer the heat generated toward the surface of the internal container and a mixing device reciprocally mobile with respect to the internal container.

11 Claims, 4 Drawing Sheets

(51) Int. Cl.
*B01F 7/00* (2006.01)
*A47J 36/16* (2006.01)
*A47J 36/06* (2006.01)

(52) U.S. Cl.
CPC ....... *A47J 43/0727* (2013.01); *B01F 7/00208* (2013.01); *A47J 36/06* (2013.01); *A47J 43/0772* (2013.01); *B01F 7/00275* (2013.01)

(58) Field of Classification Search
USPC .................................................. 366/309–313
See application file for complete search history.

(56) References Cited

U.S. PATENT DOCUMENTS

| | | | | | |
|---|---|---|---|---|---|
| 3,635,147 | A | * | 1/1972 | Lee | A47J 27/14 99/348 |
| 4,337,000 | A | * | 6/1982 | Lehmann | A21C 1/1405 366/288 |
| 4,544,281 | A | * | 10/1985 | Wilkinson | B01F 15/00 366/330.1 |
| 4,854,717 | A | * | 8/1989 | Crane | B01F 7/021 366/197 |
| 4,941,750 | A | * | 7/1990 | Bouchez | B01F 7/00275 366/147 |
| 5,249,861 | A | * | 10/1993 | Thomson | B01F 7/00925 366/194 |
| 7,314,308 | B2 | * | 1/2008 | Fallowes | A47J 43/0711 366/310 |
| 7,993,694 | B2 | * | 8/2011 | Goderiaux | A47J 43/0722 426/438 |
| 8,616,763 | B2 | * | 12/2013 | Annis | B01F 7/30 366/312 |
| 2001/0019515 | A1 | * | 9/2001 | Schmidt | B01F 7/18 366/310 |
| 2003/0053368 | A1 | * | 3/2003 | Drocco | B01F 7/246 366/98 |
| 2004/0136263 | A1 | * | 7/2004 | Backhaus | B01F 7/24 366/291 |
| 2006/0062079 | A1 | * | 3/2006 | Schmidt | B01J 2/10 366/325.1 |
| 2006/0209629 | A1 | | 9/2006 | Fallowes et al. | |
| 2006/0268659 | A1 | * | 11/2006 | Kaas | B01F 7/00583 366/312 |
| 2008/0134905 | A1 | * | 6/2008 | Peng | A47J 43/0722 99/348 |
| 2010/0303986 | A1 | * | 12/2010 | De' Longhi | A47J 37/129 426/438 |
| 2011/0185917 | A1 | * | 8/2011 | Goderiaux | A47J 43/0722 99/348 |
| 2012/0145140 | A1 | * | 6/2012 | Chang | A47J 37/0641 126/19 R |
| 2013/0135964 | A1 | * | 5/2013 | Seidler | A47J 43/0711 366/343 |
| 2014/0000462 | A1 | * | 1/2014 | Payen | A47J 37/047 99/348 |
| 2015/0374172 | A1 | * | 12/2015 | Le Grand | A47J 37/10 99/447 |
| 2017/0347833 | A1 | * | 12/2017 | Ohta | A47J 37/0623 |
| 2017/0360237 | A1 | * | 12/2017 | Ohta | A47J 43/0722 |
| 2018/0160840 | A1 | * | 6/2018 | De' Longhi | A47J 43/0727 |
| 2018/0184848 | A1 | * | 7/2018 | De' Longhi | A47J 43/046 |
| 2018/0214830 | A1 | * | 8/2018 | Kariyama | B01F 15/065 |
| 2018/0344090 | A1 | * | 12/2018 | Cox | A47J 43/085 |
| 2020/0078746 | A1 | * | 3/2020 | Rohn | B01J 19/0013 |
| 2020/0171449 | A1 | * | 6/2020 | Paasche | B01F 7/00158 |

OTHER PUBLICATIONS

International Preliminary Report on Patentability for PCT/IB2016/053434, dated Sep. 4, 2017.

* cited by examiner

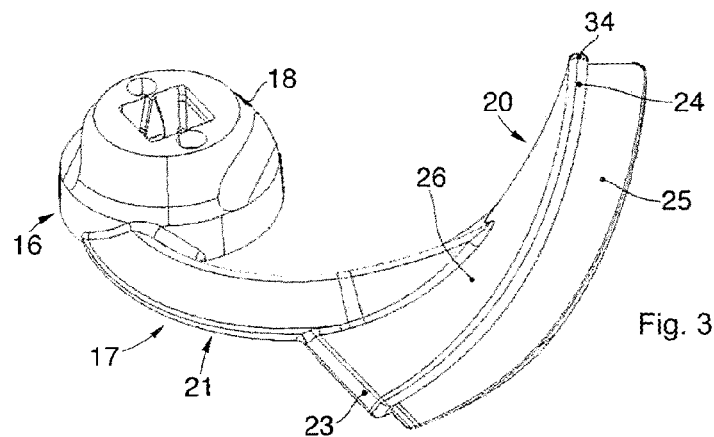
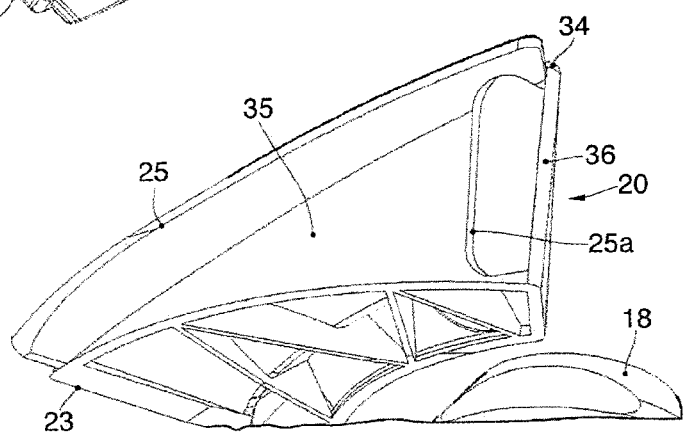
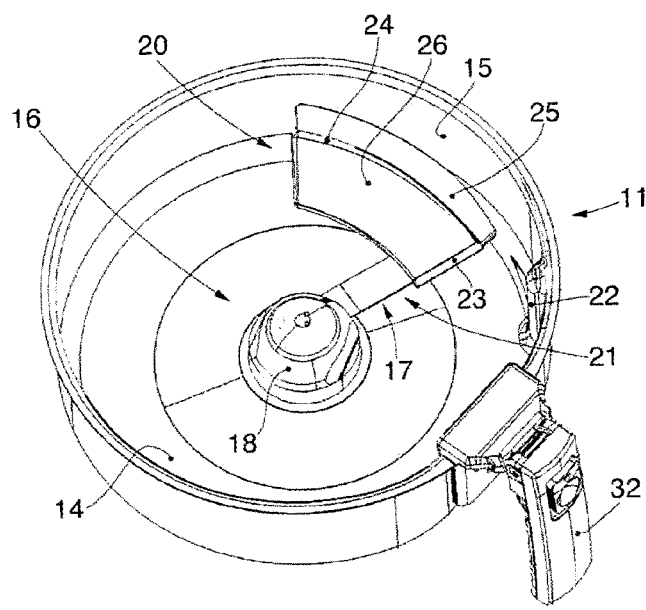

APPARATUS WITH A MIXING DEVICE FOR COOKING FOOD

FIELD OF THE INVENTION

The present invention concerns an apparatus for containing foods and for executing in them a cooking process through heating. The apparatus cooks the foods, reproducing in them the normal mixing process that the chef performs manually.

In particular, the apparatus provides a motorized mixing device to reproduce the mixing action that is normally carried out in order to obtain a recipe.

The present invention can be applied both to cooking with an abundant quantity of cooking liquid, which can be oil or other fatty material, alone or with water substances, and also to cooking with a minimum quantity of oil or fatty material.

BACKGROUND OF THE INVENTION

It is known that in the home, cooking apparatuses that have been developed over the years have led to the production of cooking apparatuses that are intended to optimize the times needed for preparing recipes, with the purpose of making certain steps automated, eliminating human intervention as much as possible, but at the same time reproducing as far as possible the optimum cooking conditions obtained by chefs.

It is also known that cooking apparatuses according to the present invention are very versatile as they allow to obtain a plurality of recipes based on the type of food, the combination of the foods and the particular cooking methods adopted.

It is also known that in recent years research and development studies have focused attention on cooking apparatuses which, in a substantially protected environment, allow to execute a great variety of recipes.

It is known that in order to obtain cooking apparatuses with the characteristics described above, and which allow to obtain particular desired results, it is necessary to provide a heating device to suitably convey the heat toward the food, said device able to include electric resistances, induction heat sources, radiation, etc. The vehicle that generates the heat can be extremely varied, and also the system to transfer the heat thus generated to the food in the desired conditions can also be extremely varied.

Furthermore, it is known that in an apparatus of the type in question here, there must be a mixing device which, in cooperation with the container, allows to move the food so as to prevent the food from sticking on the bottom of the container, that is, to correctly introduce the food to the heat affecting it.

In general, the mixing blade of the mixing device is made of a non-flexible polymer material, to guarantee effective mixing for all types of food.

In some situations, for example when the food containers do not have a perfectly circular and/or symmetrical base, known blades have a problem because not all the points of the perimeter of the base of the container are correctly reached by the action of the blade.

This problem is particularly serious if the food container has discontinuities and/or irregular shapes and/or sharp or not very rounded edges, which cannot be correctly reached by traditional mixing blades.

Problems may also be created by the deposit and incrustation of food in zones and points that are not correctly and continuously reached by the mixing action of the blade.

EP 2 052 654 describes a mixing blade terminally equipped with a spatula facing upward that serves to remove residues of food that have stuck to the walls of the container.

The purpose of the present invention is to obtain a mixing device for cooking apparatuses configured to adapt to containers made in different shapes and that can have discontinuities or depressions or sharp or not very rounded edges or that are difficult to reach for known mixing device.

Another purpose is to obtain a mixing device that allows to obtain an effective mixing both in association with food containers with a flared shape, for example with a wide radius, and also cylindrical, possibly only slightly rounded in correspondence with the connection between base and side wall.

Another purpose is to guarantee an effective mixing without causing problems of deposits and incrustations in points that are difficult for the mixing blade to reach continuously.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, an apparatus for cooking foods, is provided that can comprise an external protective container of the openable type, an extractable internal container for food, open at the top, a lid, a heating device connected to a possible mean to transfer the heat generated and a mixing device comprising at least one mixing blade, also extractable.

The internal container can be fixed, or rotating, in which case the mixing blade will be respectively rotating or fixed.

Hereafter, by way of example, we will describe only the case of a fixed internal container and a rotating mixing blade. It is within the capacity of the person of skill to make the opposite embodiment, having understood the spirit of the invention.

According to one aspect of the invention, the internal container can be horizontal or inclined.

In a variant embodiment, a base wall and a lateral wall can be configured to make the internal container substantially symmetrical with respect to an axis of symmetry. For example the base wall can be configured in a circular or quadrangular shape.

In another variant embodiment, the base wall can be configured in a rectangular or elliptical shape.

Again according to one aspect of the invention, the internal container can have a base wall either substantially flat, conical, or humped, or generally have more or less accentuated discontinuities and depressions.

Moreover, the vertical section of the internal container can have a flared shape with a wide radius, or cylindrical, possibly rounded in the corner zones.

In a variant embodiment, the lateral wall can have a continuous surface.

In another variant embodiment, the lateral wall can be discontinuous, for example with protrusions and depressions. In particular, with a substantially quadrangular or rectangular base wall, the lateral wall can have sharp or not very rounded edges.

According to one aspect of the invention, the mixing blade is provided with an upending element and possibly a translation element.

In a variant embodiment the translation element can be partly or completely made of polymer material or rigid metal material.

In one aspect of the present invention, at least the upending element is provided with a terminal cleaning element made at least partly of flexible material, or it has one of its end parts made at least partly of flexible material.

In particular, the upending element has an approach edge to move and lift the food and an exit edge.

The approach edge and the exit edge delimit a lifting plane to upend at least one part of the food from the periphery of the internal container toward its center.

The development in height of the exit edge determines a peripheral side of the upending element.

The terminal cleaning element, made autonomously or as an integrating part of the upending element, is provided in correspondence with the exit edge and on the peripheral side, and extends partly or completely on the exit edge. In this way, as well as performing its function of cleaning the internal wall of the container, it also performs an active function in upending the food toward the inside of the container.

In another variant embodiment, the translation element can be partly made of flexible material.

In another variant embodiment, the upending element can be made entirely of flexible material.

According to one embodiment, the upending element is provided with a cleaning element made of flexible material.

In a variant embodiment, the upending element is provided with another vertical cleaning element, also made of flexible material.

Advantageously, the cleaning element allows to remove the food present in the depressions, or sharp or not very rounded edges, or discontinuities, or asymmetries of the container and conform to the irregular and/or non-symmetrical development of the internal container.

The invention also concerns a method to mix the food in which the mixing blade described above is used.

BRIEF DESCRIPTION OF THE DRAWINGS

These and other characteristics of the present invention will become apparent from the following description of some embodiments, given as a non-restrictive example with reference to the attached drawings wherein:

FIG. 3 is a perspective view of a mixing device according to embodiments described here, FIG. 4 is a perspective view of a mixing device according to embodiments described here;

FIG. 5 is a perspective view of a mixing device according to embodiments described here;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

According to the present description, the invention concerns a cooking apparatus for foods 10 for a wide variety of foods, for example potatoes, vegetables, but not only, also rice, cereals in general, pasta, soups, couscous, meat, fish, whether fresh or frozen.

Furthermore, the cooking apparatus for foods 10 is able to perform different kinds of cooking, for example stews, brazing, boiling, roasting, frying, simple heating, sautéing, browning, slow or rapid cooking in general.

Figure 1:
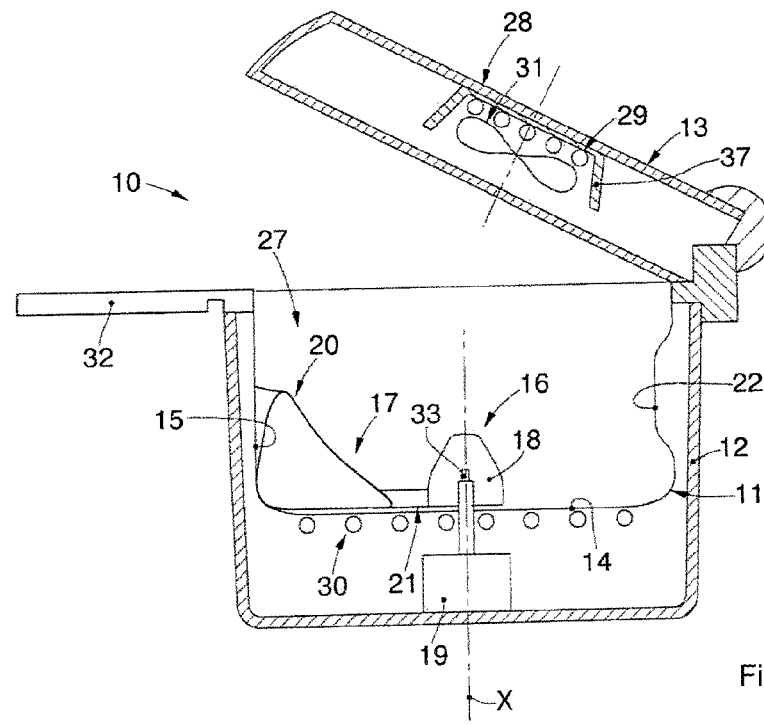
FIG. 1 is a schematic section of an apparatus for cooking food.
Figure 2:
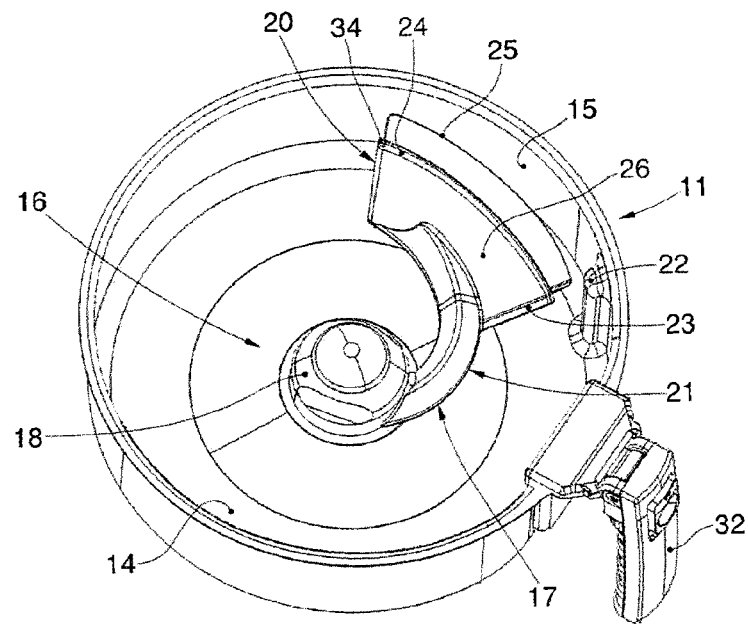
FIG. 2 is a perspective view of an internal container for food of an apparatus for cooking food.

With reference to FIGS. 1, 2 and 5, the cooking apparatus for foods 10 can comprise an external container 12.

In a variant embodiment, the external container 12 can be opened at the top by a lid 13.

The presence of the lid 13 is intended to create a protected space with the conditions needed to cook the foods.

Moreover, the lid 13 can be made of the same material as the external container 12, or a material that allows to have substantial transparency and resistance to high temperatures to allow the user to control the cooking.

For example, the lid 13 can be made of polymer material or glass.

The cooking apparatus for foods 10 also comprises an internal container 11 able to contain foods that are in different shapes, for example polyhedral, or rounded, and different consistency (liquid or solid or intermediate, for example a risotto or a soup) and different sizes, for example pieces with a big or small section.

The internal container 11 is delimited by a base wall 14 and at least one lateral wall 15.

In a variant embodiment, the base wall 14 and the lateral wall 15 can be configured to obtain the internal container 11 substantially symmetrical with respect to an axis of symmetry. For example the base wall 14 can be configured circular or quadrangular.

In another variant, the base wall 14 can be configured rectangular or elliptical.

Furthermore, the base wall 14 can be substantially flat, conical, humped, or in general have discontinuities and depressions.

In a variant embodiment, in accordance with the previous variants, the lateral wall 15 can have a continuous surface.

In a variant embodiment, in accordance with the previous variants, the lateral wall 15 can have discontinuities, for example protrusions or depressions. In particular, with a base wall 14 substantially quadrangular or rectangular, the lateral wall 15 can have sharp or not very rounded edges.

In a variant embodiment shown in FIGS. 1, 2 and 5, the lateral wall 15 has at least one stirring element 22 which is a protrusion with respect to the overall surface of the lateral wall 15. The stirring element 22 can be located at any point whatsoever of the lateral wall 15 and acts to stir the food in the internal container 11.

The apparatus for foods 10 comprises a mixing device 16.

The mixing device 16 can be rotatable by means of a drive member 19, around an axis of rotation X, or fixed.

The variant embodiments described hereafter are valid both for fixed mixing blades 17 and also rotating ones.

The mixing device 16 comprises at least one mixing blade 17 and a connection mean 18.

In a variant embodiment, the mixing blade 17 can be connected in fixed mode to the connection mean 18, or can be selectively removable.

The mixing blade 17 is provided with an upending element 20 toward the periphery of the internal container 11 and hence adjacent to the lateral wall 15.

A translation element 21 connects the upending element 20 to the connection mean 18.

The translation element 21 is configured to move at least part of the food in the direction of the upending element 20. In particular, the translation element 21 thrusts the food toward the periphery of the internal container 11.

In a variant embodiment, the translation element 21 can be partly or completely made of polymer material or metal material.

In a variant embodiment shown in FIGS. 2-4, the translation element 21 is configured with a substantially curved profile to promote the movement of the food from the center to the periphery of the internal container 11 during the rotation of the mixing device 16. In this case, the mixing blade 17 is particularly suitable to be used with granular food, that is, food characterized by little cohesion and which does not form intertwined, thick agglomerates (for example rice or other cereals, or pulses).

Hereafter, by the word "center" we mean the symmetrical development point of the internal container 11, or a point as equidistant as possible from each point on the lateral wall 15.

Figure 6:
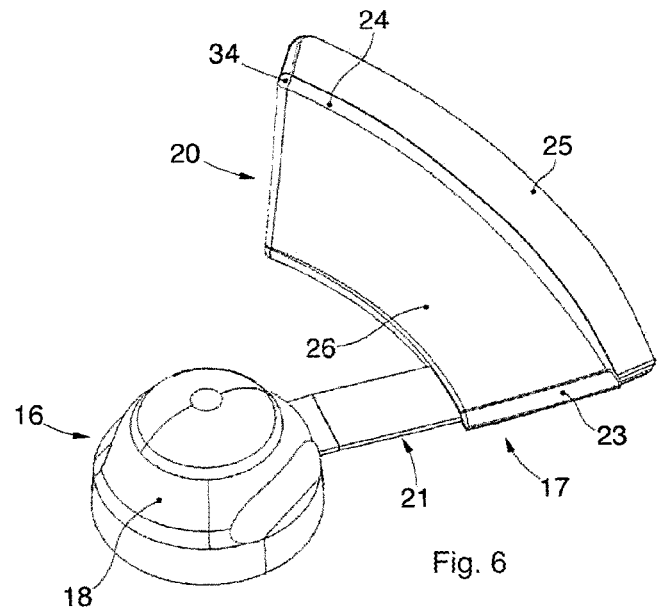
FIG. 6 is a perspective view of a mixing device according to embodiments described here.
Figure 7:
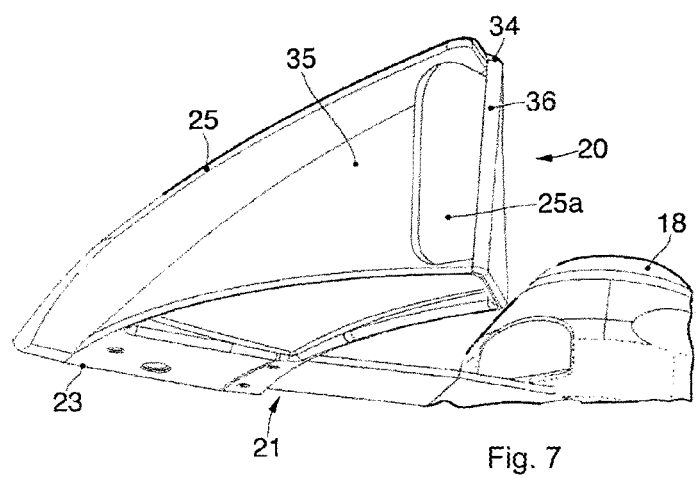
FIG. 7 is a perspective view of a mixing device according to embodiments described here.

In another variant embodiment, shown in FIGS. 5-7, the translation element 21 is configured to separate the food from the base wall 14. In this case the translation element 21 is configured substantially flat and is particularly indicated for moving cohesive foods, for example potatoes or meat.

With reference to FIGS. 2-7, the upending element 20 has an approach edge 23.

The approach edge 23 is configured to move and lift the foods.

In a variant embodiment, in order to obtain the advantages illustrated hereafter, the direction of rotation of the mixing device 16 must cause the food to be hit first by the approach edge 23.

The upending element 20 also has an exit edge 24.

The exit edge 24 can be made by the continuation of the approach edge 23. Moreover, the exit edge 24 and the approach edge 23 together delimit a lifting plane 26.

In a particular variant embodiment, the exit edge 24 can have a substantially constant height.

In another variant embodiment shown in FIGS. 3, 4, 6 and 7, the exit edge 24 can have a progressively and continuously increasing height from the approach edge 23 to a top 34.

In another variant embodiment, the lifting plane 26 near the top 34 curves toward the center of the internal container 11.

The development in height of the exit edge 24 determines a peripheral edge 35 of the upending element 20.

The peripheral side 35 has a vertical edge 36 with a height equal to the maximum height of the exit edge 24.

In a variant embodiment shown in FIGS. 2-9, in correspondence with the exit edge 24 and on the peripheral side 35, a cleaning element 25 is associated, which extends partly or completely along the exit edge 24.

The cleaning element 25 is advantageously made of flexible material and is configured to adhere to the lateral wall 15 of the internal container 11.

By flexible material we mean for example flexible rubber or similar material suitable to conform to the geometry of the internal container 11. In fact, the cleaning element 25 is suitable to remove the food present on the lateral wall 15 and in particular in correspondence with possible depressions or sharp or not very rounded edges present on the lateral wall 15 and in which food can accumulate.

Moreover, the cleaning element 25 adapts to the presence of possible protrusions on the lateral wall 15, in particular in the presence of the stirring element 22.

Figure 9:
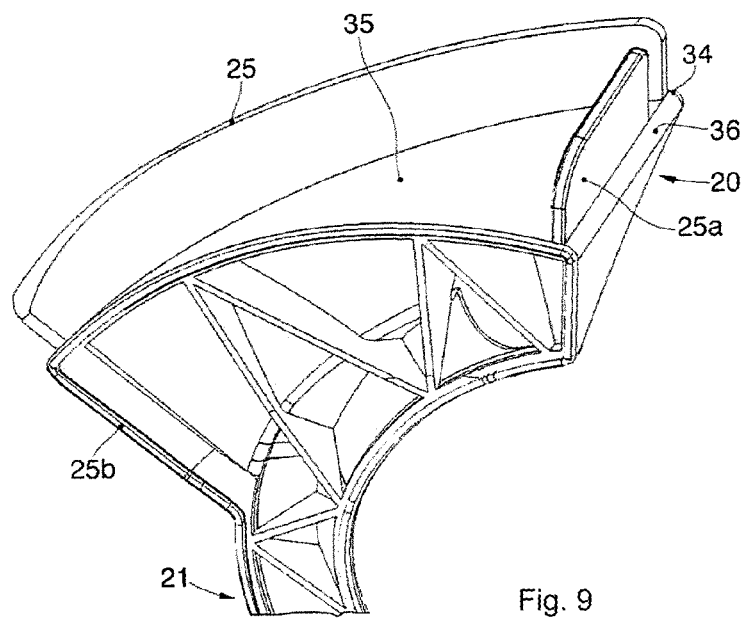
FIG. 9 is a perspective view of a mixing device according to embodiments described here.

In another variant embodiment shown in FIGS. 4, 7 and 9, combinable with any other previous embodiment, the upending element 20 can provide another vertical cleaning element 25a, made in correspondence with the vertical edge 36 of the peripheral side 35. The vertical cleaning element 25a is made of the same material as the cleaning element 25 and has the same functions.

In another variant embodiment, also combinable with each of the others, the upending element 20 and the translation element 21 can be made of a substantially rigid polymer material.

In a variant embodiment, also combinable with each of the others, the mixing blade 17 can be made partly or completely of flexible material. In particular, at least the upending element 20 can be made of flexible material.

In another variant embodiment, also combinable with each of the others, both the upending element 20 and also a part near the periphery of the internal container 11 of the translation element 21 are made of flexible material.

Figure 8:
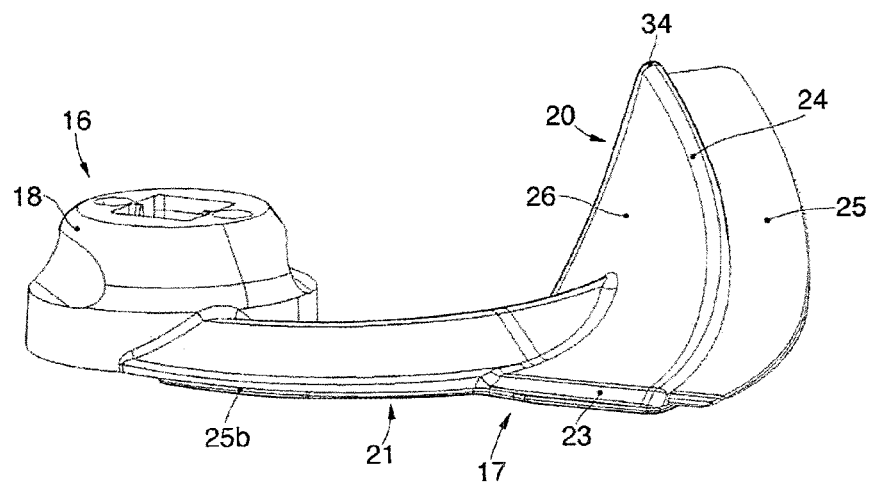
FIG. 8 is a perspective view of a mixing device according to embodiments described here.

In another variant embodiment, shown in FIG. 8, also combinable with each of the others, a horizontal cleaning element 25b can be associated with the translation element 21, also made of flexible material. The horizontal cleaning element 25b prevents the food from adhering to the base wall 14, or at least allows an adequate removal thereof, and can extend partly or completely along the front profile of the translation element 21 and along the approach edge 23.

In a variant embodiment, not shown, also combinable with each of the others, the horizontal cleaning element 25b can be can be made only in correspondence with the approach edge 23.

In another variant embodiment, shown in FIG. 9, also combinable with each of the others, the horizontal cleaning element 25b is associated with the mixing blade 17 along its whole lower perimeter, to exert an extended action of removing residues and of cleaning a wide surface of the base of the container.

The approach edge 23 and the exit edge 24 define a lifting plane 26.

The lifting plane 26 allows to progressively move the food from the approach edge 23 to the exit edge 24.

In correspondence with the exit edge 24, the food is upended from the periphery toward the center of the internal container 11. Moreover, this is achieved without causing the fragmentation of the food.

The internal container 11 can define a cooking chamber 27 selectively openable/closable by the lid 13.

The food is progressively cooked inside the cooking chamber 27.

The apparatus for cooking food 10 comprises a heating device 28 on the side facing toward the cooking chamber 27.

In a particular variant embodiment, the heating device 28 can comprise at least one heating element 29, 30.

In a particular variant embodiment, the heating device 28 can comprise two heating elements, an upper heating element 29 and a lower heating element 30.

Hereafter, the term "upper" means an element located laterally to the internal container 11, or on the top, that is, in correspondence with the aperture of the internal container 11. In the same way, the term "lower" means an element located below the base wall 14 of the internal container 11.

The heating elements, upper 29 and lower 30, can be tubular electric resistances, or resistive bands or wires, or induction resistances, able to generate heat and to convey it through induction and/or radiation.

The upper heating element 29 can be located in correspondence with the internal side of the lid 13 and advantageously facing toward the food contained inside the internal container 11.

The upper heating element 29 can be connected to a mean to transfer the heat generated 31.

At least one of either the upper heating element 29 or the mean to transfer the heat generated 31 is installed in correspondence with the lid 13.

In a variant embodiment, the upper heating element 29 and the mean to transfer the heat generated 31 can be installed in correspondence with the lateral wall 15.

The mean to transfer the heat generated 31 allows to distribute the heat generated by the upper heating element 29 uniformly inside the cooking chamber 27.

In another variant embodiment, a deflector element 37 cooperates with the upper heating element 29 and the mean to transfer the heat generated 31 to convey the heat generated toward the food.

The lower heating element 30 can be disposed near the base wall 14, that is, immediately under the internal container 11. In this way, the food is also cooked in the part below the internal container 11.

The internal container 11 can be made of metal material, for example an aluminum alloy, or stainless steel or a plastic material resistant to high temperatures.

Furthermore, the internal container 11 can be covered with any other material suitable to contrast any possible adherence of the food to the base wall 14 and the lateral wall 15.

Merely by way of example, the internal container 11 can be coated with PTFE (polytetrafluoroethylene), ceramic material or an enamel.

In a particular variant embodiment the internal container 11 can comprise at least a handle 32 suitable to facilitate the operation to extract the internal container 11 from the external container 12. The handle 32 can be attached to the internal container 11 by screws or rivets, or clamped in snap-in mode.

The internal container 11, depending on the configuration and possibly on the number of handles it has, can contain inside it a quantity of food from 1 kg to 5 kg.

In correspondence with the base wall 14 and coaxial to the axis of rotation X, the internal container 11 can comprise a coupling element 33.

In a variant embodiment shown in FIG. 1, the drive member 19 can be installed under the internal container 11.

In another variant embodiment, the drive member 19 can be installed under the lid 13 and above the internal container 11.

In some variant embodiments, another drive member is provided (not shown in the drawings) which can allow the internal container 11 to rotate.

In a particular variant embodiment, in accordance with the previous variants, the internal container 11 is fixed and the mixing device 16 rotates.

In another variant embodiment, the internal container 11 rotates and the mixing device 16 is fixed. In this particular variant the mixing blade 17 can be connected directly to the lid 13.

In another variant the mixing blade 17 can be attached to the surface of the external container 12.

In another variant the mixing blade 17 can be attached in correspondence with the axis of rotation X to the rotating internal container 11.

The fixed mixing device 16 can be anchored to the external container 12 or the lid 13, and advantageously removable.

In another variant embodiment, in accordance with the previous variants, it can be provided that the mixing device 16 rotates together with the internal container 11 with different speeds of rotation and concordant sense of rotation.

In another variant embodiment, in accordance with the previous variants, it can be provided that the mixing device 16 rotates together with the internal container 11 with different speeds of rotation and discordant sense of rotation.

According to the variant embodiments described above, a method is also defined for mixing food in an internal container 11 by means of a mixing device 16.

Taking as reference a precise moment in time in which the mixing device 16 is rotating, the food is subjected to:
- a continuous displacement of at least part of the food from the center toward the periphery of the internal container 11;
- a lifting of at least part of the food by means of the approach edge 23 on the lifting plane 26 and toward the exit edge 24;
- an at least partial upending of the food at least in correspondence with the top 34 from the periphery toward the center of the internal container 11;
- a removal of the food present in correspondence with the perimeter edge, or depressions and/or sharp or not very rounded edges, by the cleaning element 25 made of flexible material, associated with or made in a terminal and/or lower part of the upending element 20 and/or of the translation element 21.

It is clear that modifications and/or additions of parts may be made to the apparatus for cooking foods with a mixing device as described heretofore, without departing from the field and scope of the present invention.

It is also clear that, although the present invention has been described with reference to some specific examples, a person of skill in the art shall certainly be able to achieve many other equivalent forms of apparatus for cooking foods with a mixing device, having the characteristics as set forth in the claims and hence all coming within the field of protection defined thereby.

The invention claimed is:

1. An apparatus for cooking foods, comprising:
    an external container with protective lid of the openable type,
    an extractable internal container, open at the top and having a base wall and at least one lateral wall,
    a heating device configured to generate heat and connected to a means for transferring the generated heat toward an interior of the internal container,
    a mixing device reciprocally mobile with respect to the internal container, said mixing device comprising at least one mixing blade, selectively extractable, having an upending element made of a substantially rigid polymer material,
    wherein said upending element has an approach edge in order to move and lift the food and an exit edge provided as a continuation of the approach edge, said approach edge and exit edge delimiting a lifting plane, in order to upend at least a part of the food from the periphery of the internal container toward its center, and wherein the development in height of said exit edge determines a peripheral side of the upending element, and a cleaning element that extends partly or completely over said exit edge, said cleaning element being made at least partly of a flexible material suitable to conform to the geometry of the internal container.

2. The apparatus for cooking food as in claim 1, wherein said upending element comprises another vertical cleaning element made of flexible material and in correspondence to a vertical edge of a peripheral side of said upending element.

3. The apparatus for cooking food as in claim 2, wherein said exit edge has a substantially constant height.

4. The apparatus for cooking food as in claim 2, wherein said exit edge has a progressively and continuously increasing height.

5. The apparatus for cooking food as in claim 1, comprising a translation element to move at least part of the food from the center toward the periphery of the internal container and in that said translation element is at least partly made of flexible material.

6. The apparatus for cooking food as in claim 1, wherein a horizontal cleaning element made of flexible material is associated with the lower perimeter of the translation element and of the upending element of the mixing blade.

7. The apparatus for cooking food as in claim 1, wherein said base wall and said lateral wall are provided with protrusions and/or depressions and/or sharp or not very rounded edges.

8. The apparatus for cooking food as in claim 1, wherein the flexible material comprises rubber.

9. Method for mixing foods in a cooking apparatus as in claim 1, inside an internal container having a base wall, in which the mixing device is reciprocally mobile with respect to the internal container, said mixing device comprising at least a mixing blade and a connection mean, wherein it provides that the mixing device carries out, in sequence:

a continuous displacement of at least part of the food from the center toward the periphery of the internal container;

a lifting of at least part of the food by means of an approach edge of the upending element on a lifting plane and toward an exit edge of said upending element;

an at least partial upending of the food at least in correspondence with a top from the periphery of the internal container toward the center;

a removal of the food present in correspondence with a perimeter edge, or depressions and/or sharp or not very rounded edges, by a cleaning element or by said exit edge made at least partly of flexible material suitable to conform to the geometry of the internal container.

10. An apparatus for cooking foods, comprising:

an external container with protective lid of the openable type, an extractable internal container, open at the top and having a base wall and at least one lateral wall, a heating device configured to generate heat and connected to a means for transferring the generated heat toward an interior of the internal container, a mixing device reciprocally mobile with respect to the internal container, said mixing device comprising at least one mixing blade, selectively extractable, having an upending element, wherein said upending element has an approach edge in order to move and lift the food and an exit edge provided as a continuation of the approach edge, said approach edge and exit edge delimiting a lifting plane, in order to upend at least a part of the food from the periphery of the internal container toward its center, wherein the development in height of said exit edge determines a peripheral side of the upending element, and wherein said upending element is made at least partly of a rubber material suitable to conform to the geometry of the internal container.

11. The apparatus for cooking food as in claim 10, wherein the upending element is completely made of rubber.

* * * * *